Nov. 21, 1950     H. W. LEVERENZ     2,530,828
RADAR SYSTEM FOR INDICATING MOVING OBJECTS
Filed March 29, 1946     2 Sheets-Sheet 1

INVENTOR.
Humboldt W. Leverenz
BY
ATTORNEY

Nov. 21, 1950     H. W. LEVERENZ     2,530,828
RADAR SYSTEM FOR INDICATING MOVING OBJECTS
Filed March 29, 1946     2 Sheets-Sheet 2

INVENTOR.
Humboldt W. Leverenz
BY
ATTORNEY

Patented Nov. 21, 1950

2,530,828

UNITED STATES PATENT OFFICE 2,530,828

RADAR SYSTEM FOR INDICATING MOVING OBJECTS

Humboldt W. Leverenz, Princeton, N. J., assignor to Radio Corporation of America, a corporation of Delaware Application March 29, 1946, Serial No. 657,971

12 Claims. (Cl. 343—9)

This invention relates to the art, commonly known as "radar," of detection and location of objects by radio waves, and more particularly to improvements in visual indication of radar information.

The principal object of the present invention is to provide methods of and means for discriminating between stationary and moving objects in a radar display.

Figure 1:
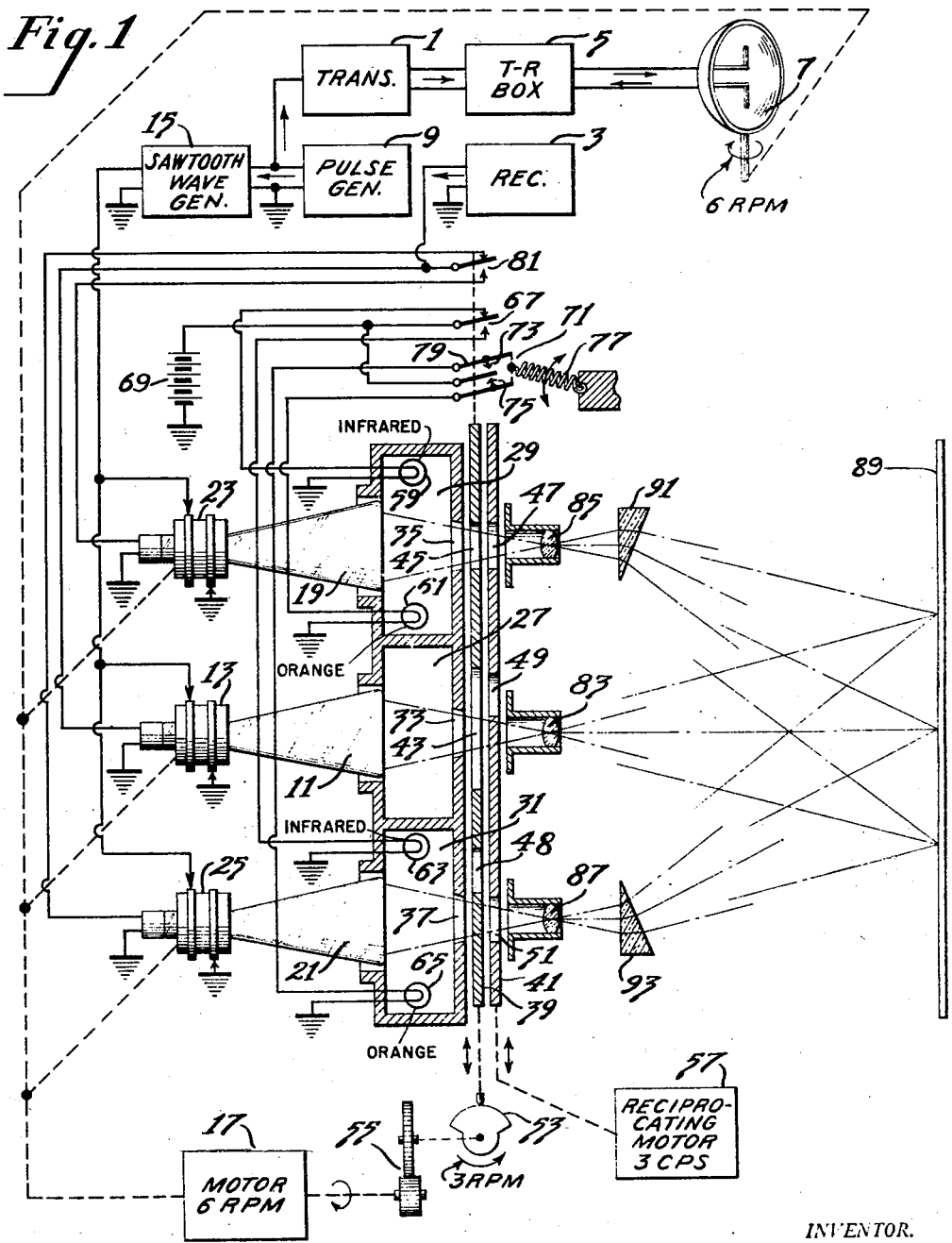
Figure 2:
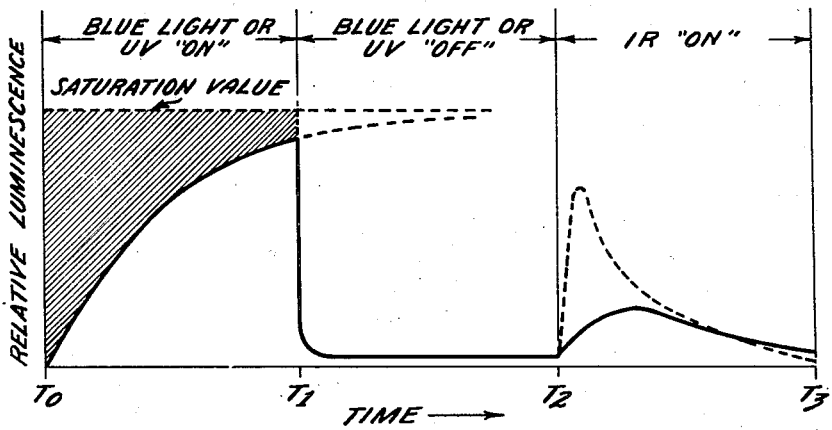
Figure 3:
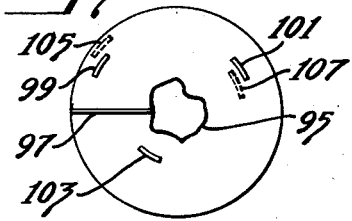

The invention will be described with reference to the accompanying drawings, wherein:

Figure 1 is a schematic diagram of a radar system of the plan position indicator (P. P. I.) type embodying the instant invention, Figure 2 is a graph illustrating the characteristics of an infra-red sensitive phosphor used in the practice of the invention, Figure 3 shows a typical indication produced by the system of Figure 1.

Figure 4:
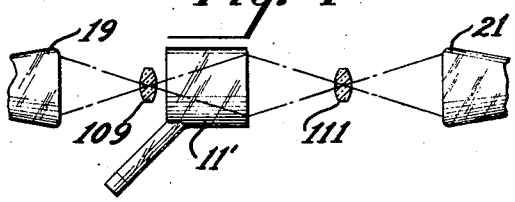
Figure 5:
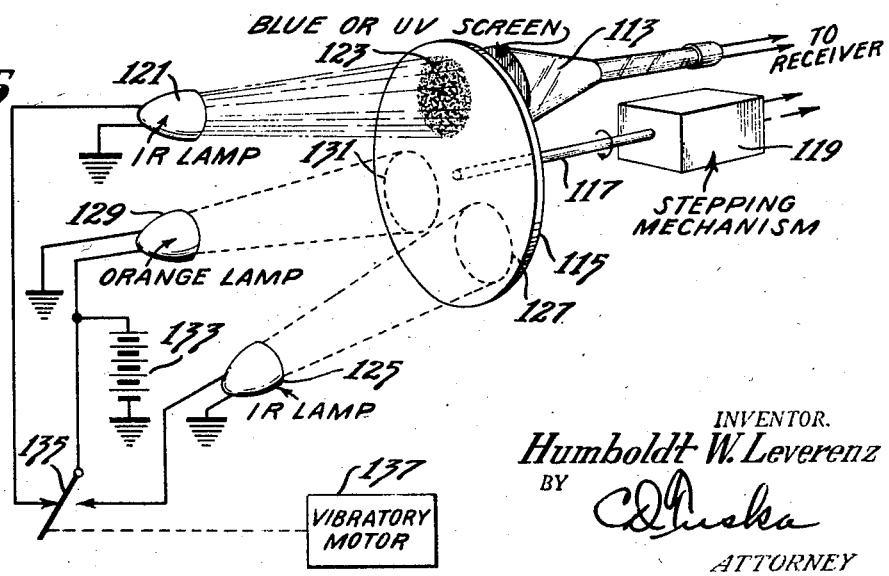

Figure 4 is a schematic diagram of a modified optical arrangement for the system of Figure 1, and Figure 5 is a schematic diagram of a further modification of the invention.

Referring to Figure 1, a transmitter 1 and a receiver 3 are connected through a duplexing device 5, commonly called a "T-R box," to a directive antenna 7. The transmitter 1 is controlled or modulated by a pulse generator 9 to produce periodically short bursts or pulses of radio frequency energy which are radiated by the antenna 7. The pulses may be of the order of one microsecond duration, recurring at a frequency of several hundred cycles per second.

The output circuit of the receiver 3 is connected to the intensity control electrode of a cathode ray tube 11. The tube 11 has a long-persistence luminescent screen and is provided with a rotatable deflection yoke 13, connected to a sawtooth wave generator 15. The sawtooth generator 15 has a synchronizing connection to the pulse generator 9, so that each pulse initiates a sawtooth, deflecting the cathode ray beam at a constant speed radially of the screen of the tube 11, in a direction depending upon the angular position of the yoke 13. A constant speed motor 17 rotates the yoke 13 and the directive antenna 7 together at a speed of, for example, 6 revolutions per minute.

The system as thus far described is a conventional radar of the P. P. I. type, and operates as follows:

As the antenna 7 rotates, pulses from the transmitter 1 are radiated, each in a slightly different direction. With each pulse, the cathode ray beam of the tube 11 starts from the center of the screen and sweeps radially outward in the corresponding direction. The intensity control may be biassed so that the beam is so weak as to produce little or no luminescence on the screen.

When the radiated pulse strikes a reflecting object, such as an airplane, it is returned to the radar where it is received and amplified in the receiver and momentarily overcomes the bias, producing a bright spot on the screen. The radial position of this spot depends upon the length of time required for the pulse to travel to the reflecting object and back, and hence indicates the distance. The angular position shows the direction. During each 10 seconds period, the antenna 7 scans the entire horizon, and the distances and directions of all reflecting objects within the range of the equipment are shown in plan view on the cathode ray screen. Owing to screen persistence and repetition of the scan, all parts of the picture remain visible continuously.

The bright spots, or "pips" corresponding to moving objects such as aircraft are generally displaced to a new position with successive scans. This displacement is frequently too small to be perceptible as motion. Since stationary objects also reflect, the picture is sometimes cluttered with bright spots and lines caused by surrounding terrain and objects upon it. The word "stationary" is used herein to mean fixed with respect to the radar equipment. While these indications do not move, they make it difficult to find and observe the ones which are moving.

In accordance with the present invention each picture is stored and its presentation is delayed for direct comparison with the next, or a subsequent picture. The two pictures will be identical except for the positions of the spots which represent moving objects. These positions will differ in the two pictures, by amounts corresponding to the total motions of the respective objects during the delay interval.

Comparison is preferably effected by optically superimposing the two images and displaying first one and then the other at a rate of, for example, three alternations per second. The parts corresponding to fixed objects, being the same in both pictures, will not change; the parts corresponding to moving objects will appear to jump from one position to another as the pictures are alternated. These indications are easily distinguishable from the stationary clutter, and by their rhythmic motion tend to attract the attention of the observer.

In the system of Figure 1, the apparatus for producing the above described "jump" indications includes two additional cathode ray tubes 19 and 21, provided respectively with rotatable deflection yokes 23 and 25 like the yoke 13. The screens of the tubes 19 and 21 are provided with a stimulable phosphor, which has the ability to store energy supplied to it directly or indirectly by the cathode ray beam, and release energy in the form of visible light when stimulated. For example, a strontium sulphide phosphor containing small amounts of samarium and cerium, will absorb and store cathode ray energy. A large part of this stored energy can be liberated as visible light upon irradiation of the phosphor by infrared. A strontium sulphide phosphor of this type may be used, or the tubes 19 and 21 may have two-layer screens. In this case the inner layer, nearer the cathode ray gun, is made of any of the known phosphors which provide blue, green, or ultraviolet light in response to cathode rays.

The outer layer, which may be either inside or outside the glass envelope of the tubes, is an infrared stimulable phosphor of the type described in copending U. S. patent application Serial No. 595,146 filed May 22, 1945, by H. W. Leverenz, now Patent No. 2,527,365, issued Oct. 24, 1950, and entitled Phosphor Material. This phosphor has the characteristic of being excited and sensitized by blue, green or ultraviolet light. Some of the energy of the exciting light is converted immediately to visible light, by fluorescence, which subsides with the cessation of the exciting light. A part of the energy of the exciting light is stored in the phosphor. A substantial amount of the stored energy can be liberated, as visible light, by infrared energy. The stored energy may be dissipated or "quenched" by exposing the phosphor to orange-colored light. After sufficient "quenching," the luminescence stimulable by infrared is negligibly small.

The cycle can then be repeated, with successive irradiation of the phosphor by blue, green or ultraviolet light for exciting, infrared light or heat for stimulation, and orange light for quenching. Figure 2 shows the light output as a function of time. During the period $T_0$ to $T_1$, the phosphor is being excited by blue light. The cross hatched area above the curve represents the energy stored in the phosphor, while the area under the curve represents the energy released immediately as light. During the period $T_1$ to $T_2$, no energy is applied to the phosphor and very little is given off by it.

During the period $T_2$ to $T_3$, the phosphor is being stimulated by infrared and releases the stored energy as light. The solid portion of the curve in this region shows the light output with one intensity of infrared stimulation while the dash line curve shows the light output with a higher intensity of infrared. The light emitted under infrared stimulation is generally the same color as that produced by the initial blue or ultraviolet excitation.

The screen ends of the tubes 11, 19 and 21 extend into substantially light-tight enclosures 27, 29 and 31, provided with apertures 33, 35 and 37 respectively. A pair of slidable shutter members 39 and 41 are disposed adjacent the apertures 33, 35 and 37.

The shutter 39 is provided with apertures 43, 45 and 46 cooperating with the apertures 33, 35 and 37 respectively. When the shutter 39 is in its upper position (shown in Figure 1) the aperture 37 is closed and the aperture 35 is uncovered by the shutter aperture 45. When the shutter 39 is in its lower position, the aperture 35 is closed while the aperture 37 is uncovered. The shutter aperture 43 is long enough so that the aperture 33 is open in both positions of the shutter.

The shutter 41 is provided with apertures 49, 47, and 51 respectively cooperating with the apertures 33, 35 and 37. The arrangement is such that when the shutter 41 is in its upper position (shown in Figure 1), apertures 35 and 37 are uncovered, while the aperture 33 is closed. When the shutter 41 is in its lower position, the aperture 33 is uncovered and the apertures 35 and 37 are closed.

The shutter 39 is operated by a cam 53, driven by the scanning motor 17 through gearing 55 at one-half the scanning rate. Thus the shutter 39 is in its upper position during one scan and in its lower position during the next, etc. The shutter 41 is coupled to a reciprocating motor 57 which oscillates the shutter 41 between its upper and lower positions at a rate of approximately three cycles per second.

The enclosure 29 associated with the tube 19 contains an infrared lamp 59 and an orange colored lamp 61. The enclosure 21 is similarly provided with an infrared lamp 63 and an orange lamp 65. The infrared lamps 59 and 63 are connected through a double throw switch 67 to a source 69. The switch 67 is coupled to the shutter 39, so that when the shutter 39 is in its upper position, the lamp 59 is energized and the lamp 63 is out. When the shutter 39 is in its lower position, the lamp 63 is energized and the lamp 59 is out. The orange lamps 61 and 65 are likewise connected to the source 69 through a double throw switch 71. The switch 71, while electrically similar to the switch 67, is provided with movable contact points 73 and 75 which are urged away from their center positions by a spring 77. A contact 79, corresponding to the moving contact of the switch 67, is coupled to the shutter 39. When the shutter 39 moves toward its lower position, the contact 79 strikes the contact 75 and closes the circuit to the orange lamp 61. Continued motion of the shutter downward forces the contact 75 past its dead center, causing both of the contacts 73 and 75 to snap to their lower positions and break the circuit to the lamp 61. When the shutter 39 moves up again, the contact 79 strikes the contact 73, momentarily energizing the orange light 65 and causing the contacts 73 and 75 to snap to their upper positions as shown in Figure 1.

A third double throw switch 81 is also coupled to the shutter 39, and is connected between the output circuit of the receiver 33 and the intensity control electrodes of the tubes 19 and 21. When the shutter 39 is in its upper position, the tube 21 is connected to the receiver, and when the shutter 39 is in its lower position, the tube 19 is connected to the receiver.

Projection lenses 83, 85 and 87 are provided in alignment with the screens of the tubes 11, 19, 21 respectively in front of the shutters 39 and 49. The lens 83 projects the image appearing on the face of the tube 11 upon a screw 89. Prisms 91 and 93 are provided in front of the lenses 85 and 87 to deflect the images projected from the tubes 19 and 21 into substantial coincidence on the screen 89 with the image projected from the tube 11.

In the operation of the system of Figure 1, the tube 11 presents a continuous picture of the surroundings, both fixed and moving, as described before. This picture always comprises the latest available information in the system. When the shutter 39 is in its upper position as shown, the aperture 37 is closed and the tube 21 is connected to the receiver. Both lights 63 and 65 are off. The information received during this scanning period appears on the face of the tube 21, but is not projected on the screen 89. The infrared sensitive layer on the tube 21 is excited as described above, so that a latent image of the currently received information is stored.

At the conclusion of the scan, the shutter 39 is moved to its lower position, opening the aperture 37 and closing the aperture 35. The infrared lamp 63 is energized, making the stored image on the screen of the tube 21 appear in luminescence. At this time the picture on the tube 21 is that which was stored during the previous scan while that on the tube 11 is the current information. The shutter 41 oscillates up and down, alternately exposing the tubes 11 and 21, so that their pictures are alternately projected in substantial positional coincidence on the screen 89. As described above, any spots or lines corresponding to moving objects within range of the system will appear to jump, while those corresponding to stationary objects do not change.

During the time that the images on the tubes 11 and 21 are being alternately displayed on the tube 89, the tube 19 is connected to the receiver 3 and is storing the current information. At the end of this period, the shutter 39 is again driven to its upper position, extinguishing the infrared lamp 63 and momentarily energizing the orange lamp 65. The momentary burst of orange light eradicates the latent image from the screen of the tube 21, preparing it for the next cycle. The infrared lamp 59 irradiates the tube 19 and the resulting image is displayed alternately with that on the tube 11. The above described cycle of operation is repeated continuously. Thus there appears on the screen 89 a continuous succession of alternate displays of images whose elements corresponding to the latest information and images whose respective elements correspond to information ten seconds older. If desired, the screen of the tube 11 may be designed to provide luminescence of a color which contrasts with that of the tubes 19 and 21, thus affording even clearer discrimination between fixed and moving objects.

Referring to Figure 3, the areas outlined in solid lines represent the luminescent areas in the display on the tube 11. The irregular center portion 95 represents reflections from the surface area near the antenna 7. The radial line 97 is the trace produced by the current scan of the cathode ray beam. The "pips" 99 and 101 indicate reflecting objects which are in motion. The "pip" 103 represents a stationary reflecting object. The areas outlined in dash lines represent luminescent areas on the screen of the tube 19 which do not coincide in position with the corresponding pips on the tube 11. Thus the pip 105 is displaced upward from the pip 99, indicating that this object is moving in a "northerly" direction. Similarly the pip 107 is displaced downwardly from the pip 101 indicating "southerly" motion.

The practice of the present invention is not limited to the particular system shown in Figure 1. For example, the images may be optically superimposed by the arrangement schematically shown in Figure 4, where the infrared sensitive tubes 19 and 21 face each other and the screen of a tube 11'. The tube 11' is similar to the tube 11 of Figure 1 with the exception that it is designed with an offset throat portion to expose both sides of its screen. The image from the tube 19 is superimposed on the screen of the tube 11' by projection through a lens 109, and that on the screen of the tube 21 is projected to the tube 11' through a lens 111. The necessary shutters and exciting and stimulating light sources are not shown in Figure 4 but may be similar in general construction to those shown in Figure 1.

Referring to Figure 5, the single cathode ray tube 113 is connected continuously to the receiver (not shown in Figure 5), like the tube 11 in the system of Figure 1. The tube 113 has a screen designed to emit blue or ultraviolet light in response to cathode rays. A transparent disk 115 is supported on a rotatable shaft 117 in front of and off-center with respect to the tube 113. The disk 115 is coated with the above described infrared sensitive phosphor material. A stepping mechanism 119 is coupled to the shaft 117. The mechanism 119 includes any known or conventional arrangement of cams or ratchets to rotate the disk 115 through an angle of 120 degrees at the conclusion of each scanning period.

A spotlight 121 containing an infrared lamp is directed at the area 123 on the disk 115 directly in front of the screen of the tube 113. A second infrared spotlight 125 floods the area 127 on the disk 115 which was previously in front of the screen of the tube 113. A third spotlight 129 containing an orange colored lamp covers the area 131 previously irradiated by the infrared lamp 125. The lamp 129 is continuously energized by the source 123. The lamps 121 and 125 are alternately energized from the source 123 through a double throw switch 135. A vibratory motor 137 drives the switch cyclically from one position to the other at a frequency of the order of three cycles per second.

In the operation of the system of Figure 5, the area 123 on the disk 115 is excited by the image appearing on the screen of the tube 113. With the apparatus in the position shown in Figure 5, the area 127 has been excited during the previous scanning period. The lamps 121 and 125 are alternately switched on and off, stimulating the areas 123 and 127 alternately. As in the system of Figure 1, the latest information appears in the area 123 and corresponding ten seconds older information appears in the area 127. A projection system similar to that shown in Figure 1 may be used to optically superimpose the images in the areas 123 and 127 or any other known method of optical superposition may be employed.

It is necessary to compensate for or prevent the rotation of the image in moving from the position of the area 123 in Figure 5 to that of the area 127. This may be done optically, or by providing circular inserts supported in antifriction bearings on the disk 115, weighted or magnetically aligned to maintain upright positions as the disk is rotated. The area 131, having been used in a previous display is, in the position shown in Figure 5, being quenched by the orange light on the lamp 21 in preparation for its next exposure to the screen of the tube 113.

Although no shutters are required in the system of Figure 5, it will be apparent without further illustration that alternate displays of the images at different positions on the disk 115 may be effected by means of shutters instead of by alternate illumination with infrared light. A further obvious possibility is to provide a second cathode ray tube behind the area 121 to allow direct superposition of the current and past images without requiring prisms, reflectors, or other optical apparatus. It will be apparent that the indicator system of Figure 1, as well as that of Figure 5, is not restricted to use with P. P. I. displays, but may be employed with any known type of cathode ray presentation of radar information.

The invention has been described as an improvement in the visual indication of radar-derived information wherein each complete image is recorded during the scanning period and presented during the next subsequent scanning cycle, together with the currently produced image. The two images are viewed in the same position preferably alternately at a rate considerably slower than the frequency corresponding to persistence of vision. Portions of the image which correspond to moving objects in the field appear to jump with each alternation, while those corresponding to stationary objects do not move.

I claim as my invention:

1. In an object detector system including means for transmitting radiant energy, means for receiving said energy after reflection by an object, and a cathode ray tube provided with a luminescent screen and connected to said receiving means to indicate the position of said object, a system for indicating motion of said object, including a second cathode ray tube having a screen including an infrared stimulable phosphor, means periodically connecting said second cathode ray tube to said receiving means to excite said phosphor and store energy therein at points on said screen to represent an image, means periodically irradiating said screen with infrared radiation after each excitation thereof to stimulate said phosphor and render said image visible, means displaying alternately the current image on said first cathode ray tube and said last mentioned image, and means periodically irradiating said phosphor with quenching light to remove said last mentioned image.

2. The invention set forth in claim 1 including a third cathode ray tube also having a screen including an infrared stimulable phosphor, means for periodically connecting said third cathode ray tube to said receiving means in staggered time relationship with the periodic connection of said second cathode ray tube thereto, and during said stimulation of the phosphor of said second cathode ray tube, to excite said phosphor of the third tube and to store energy therein at points on said screen also to represent an image, means for periodically irradiating the screen of the third tube with infrared radiations after each excitation thereof to stimulate the phosphor thereof to render visible the image represented thereon, means effective during periods of excitation of the second cathode ray tube for displaying alternately several times the image which is then current on said first cathode ray tube and the image which is then rendered visible by stimulating the phosphor of the third tube, and means for periodically irradiating the phosphor of the third tube with quenching light, after each excitation and subsequent stimulation thereof, to remove energy stored therein.

3. A system for comparing successive images of a sequence of similar images, including a body of infrared stimulable phosphor, a source of exciting radiation and means for controlling said source to trace each successive image on said phosphor thereby storing energy in said phosphor at points on said body to represent said image, means for displaying visibly each of said successive images as it occurs, means periodically stimulating said phosphor with infrared light to release said energy and render each of said stored images visible concurrently with the visible display of a subsequently occurring image, and means periodically irradiating said phosphor with orange-colored light after each stimulation to quench said stored image.

4. In a radar system including means for transmitting and receiving radiant energy and visual indicator means including a cathode ray tube; apparatus for indicating motion of reflecting objects within the field of said transmitting and receiving means including a body of stimulable phosphor, means for periodically exposing said phosphor to an exciting image corresponding to that currently produced on said cathode ray tube to store energy representing said then current image on said phosphor, means for periodically exposing said phosphor to a source of stimulating energy subsequent to each exposure to an exciting image to produce thereon a visual image corresponding to that previously shown on said cathode ray tube, and means for displaying the current image on said cathode ray tube and said stimulated image alternately in substantial registry.

5. A radar indicator system including means providing a cyclically revised visual image showing substantially the current positions of reflecting objects within a predetermined space, a body of stimulable phosphor, means periodically exciting said body to store energy thereon representing images corresponding to the then current visual images, means periodically stimulating said body to liberate said stored energy and cause said images to become visible during periods subsequent to those during which they are stored, and means for exhibiting said stimulated images and the current visual images in substantial optical registry alternately at a rate slower than the frequency of persistence of vision.

6. The method of displaying radar information which is derived in successive scans, comprising the steps of storing energy representing an image corresponding to said information derived during each respective scanning period, producing a visible image corresponding to said information derived during each current scanning period, releasing said stored energy and thereby rendering said stored image visible during a scanning period subsequent to that in which it was stored, and alternately exhibiting said visible stored image and said currently derived visible image at a rate between one and ten cycles per second.

7. The method of displaying radar information which is derived in successive scans, comprising the steps of storing energy representing an image corresponding to said information derived during each respective scanning period, producing a visible image corresponding to said information derived during each current scanning period, releasing said stored energy to render said stored image visible during a scanning period subsequent to that in which it was stored, and alternately exhibiting said visible stored image and said currently derived visible image at a rate slower than the critical flicker frequency of the human eye.

8. The method of displaying radar information which is derived in successive scans, comprising the steps of storing energy representing an image corresponding to said information derived during each respective scanning period, producing a visible image corresponding to said information derived during each current scanning period, releasing said stored energy to render said stored image visible during a scanning period subsequent to that in which it was stored, and alternately exhibiting said visible stored image and said currently derived visible image at a rate slower than the frequency corresponding to persistence of vision.

9. The method of discriminating between fixed and moving objects in a display which comprises a sequence of respectively current images, comprising the steps of storing energy representing each current image, exhibiting each current image in visible form, releasing said energy to render each of said stored images visible contemporaneously with a subsequent current image, and displaying said stored image and the then current image alternately.

10. The method of discriminating between fixed and moving objects in a display which comprises a sequence of images, including the sequential series steps of storing energy representing each image, exhibiting each current image in visible form, releasing part of said energy to render each of said stored images visible contemporaneously with a subsequent current image, displaying said stored image and the then current image alternately, dissipating any residual stored energy, and cyclically repeating the foregoing steps.

11. The method of discriminating between fixed and moving objects in a display which comprises a sequence of respectively current images, comprising the steps of storing energy representing each current image, exhibiting each current image in visible form, rendering each of said stored images visible contemporaneously with a subsequent current image, and displaying said visible stored image and the then current image alternately.

12. In a radar system including means for transmitting and receiving radiant energy and visual indicator means including a cathode ray tube; apparatus for indicating motion of reflecting objects within the field of said transmitting and receiving means including a body of infrared stimulable phosphor, means for periodically exposing said phosphor to an exciting image corresponding to that currently produced on said cathode ray tube to store energy representing said then current image in said phosphor, a source of infrared energy, means for periodically stimulating said phosphor by exposure to said source of infrared energy subsequent to each exposure to an exciting image to produce thereon a visual image corresponding to that previously shown in said cathode ray tube, means for displaying the current image on said cathode ray tube and said stimulated image alternately in substantial registry, a source of quenching energy, and means for exposing said phosphor to said quenching energy subsequent to each exposure to stimulating energy.

HUMBOLDT W. LEVERENZ.

REFERENCES CITED

The following references are of record in the file of this patent:

UNITED STATES PATENTS

| Number | Name | Date |
| --- | --- | --- |
| 1,996,492 | Schroler | Apr. 2, 1935 |
| 2,026,725 | Baker | Jan. 7, 1936 |
| 2,247,112 | Batchelor | June 24, 1941 |
| 2,280,191 | Hergenrother | Apr. 21, 1942 |
| 2,395,099 | Cage | Feb. 19, 1946 |
| 2,408,050 | De Rosa | Sept. 24, 1946 |

FOREIGN PATENTS

| Number | Country | Date |
| --- | --- | --- |
| 481,132 | Great Britain | Mar. 7, 1938 |